United States Patent [19]

Shimei et al.

[11] Patent Number: 5,707,318
[45] Date of Patent: Jan. 13, 1998

[54] AUTOMATIC TRANSMISSION CONTROL DEVICE

[75] Inventors: Masato Shimei, Nagoya; Suguru Futamura, Toyokawa, both of Japan

[73] Assignee: Aisin Sekiki Kabushiki Kaisha, Kariya, Japan

[21] Appl. No.: 644,571

[22] Filed: May 10, 1996

[30] Foreign Application Priority Data

May 10, 1995 [JP] Japan .................................. 7-112053

[51] Int. Cl.$^6$ .................................................. B60K 41/10
[52] U.S. Cl. ..................................... 477/133; 477/149
[58] Field of Search ............................... 477/133, 148, 477/149

[56] References Cited

U.S. PATENT DOCUMENTS

| | | | |
|---|---|---|---|
| 4,727,773 | 3/1988 | Sumiya et al. | 477/149 |
| 4,833,945 | 5/1989 | Kondo | 477/133 |
| 5,058,461 | 10/1991 | Shimei . | |
| 5,070,747 | 12/1991 | Lentz et al. | 477/149 |
| 5,188,006 | 2/1993 | Goto et al. | 477/133 |
| 5,319,998 | 6/1994 | Iwatsuki et al. | 477/149 |
| 5,383,825 | 1/1995 | El-Khoury et al. | 477/149 |

OTHER PUBLICATIONS

Manual for the Toyota Toyoace New Automobile, pp. 5–53 (published in 1985).

*Primary Examiner*—Dirk Wright
*Attorney, Agent, or Firm*—Burns, Doane, Swecker & Mathis, LLP

[57] ABSTRACT

An automatic transmission control device for use in controlling an automatic transmission that includes a plurality of friction engaging devices disposed between the rotational shaft of the engine and the output shaft in order to control gear ratios includes a control device which controls the engaging operation and the disengaging operation of each of the friction engaging devices. The control device changes the time when the engagement side friction engaging device begins to engage based on the gear ratio from which the power-on down shift operation is being made and the gear ratio to which the power-on down shift operation is being made. Thus, in the case of a 4→2 power-on down shift operation the time when the engagement side friction engaging device begins to engage is longer than during a 3→2 power-on down shift operation. In this way, temporary increases in the engine rotational speed are prevented and shift shock is avoided.

14 Claims, 7 Drawing Sheets

AUTOMATIC TRANSMISSION CONTROL DEVICE

FIELD OF THE INVENTION

The present invention relates to an automatic transmission and more particularly pertains to an automatic transmission control device which controls the engagement and disengagement of a plurality of friction engaging elements.

BACKGROUND OF THE INVENTION

Shift control systems of an automatic transmission are operated, on the one hand, by a combination of one-way clutches, multiple friction engaging elements (clutches, brakes) and band brakes and, the other hand, by a combination of multiple friction engaging elements (clutches, brakes). The shift control system includes a control device for controlling the operation (engagement and disengagement) of the multiple friction engaging elements. The control device supplies oil to a corresponding friction engaging element in response to an up-shift condition or a down-shift condition so that the friction engaging element is changed from the disengaged condition to the engaged condition by oil pressure. On the other hand, the control means decreases the oil pressure of a corresponding friction engaging element in response to the up-shift or the down-shift condition so that the friction engaging element is changed from the engaged condition to the disengaged condition.

During down shift of the automatic transmission, there is a power-off down-shift and a power-on down-shift. In the shift control system which is operated by a combination of multiple friction engaging elements, an automatic transmission control device which is intended to reduce shift shock from occurring at the power-on down-shift is shown in a manual for the Toyota TOYOACE New Automobile, pages 5-53 (published in 1985). In this automatic transmission control device, the increase of the oil pressure for the disengaged friction engaging element which begins to engage (the engagement side friction engaging element), or the time when the oil pressure in the disengaged friction engaging element begins to be increased is delayed in response to the vehicle's speed. The oil pressure of the disengaged friction engaging element which is beginning to engage (the engagement side friction engaging element) is increased in response to a decrease in the oil pressure of the engaged friction engaging element which is beginning to disengage (the disengagement side friction engaging element).

Figure 8:
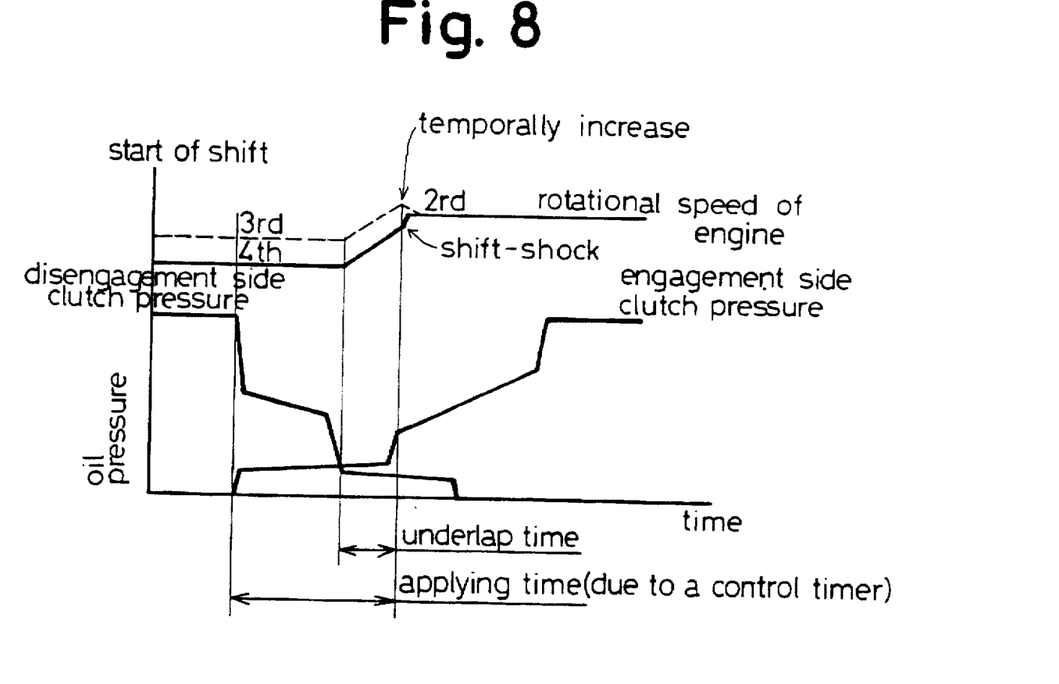
FIG. 8 is a graph depicting the oil pressure of the disengagement side friction engaging element, the oil pressure of the engagement side friction engaging element, and the rotational speed of an engine at the power-on down-shift in a prior automatic transmission control device.

FIG. 8 is a graph depicting characteristics of the oil pressure of the disengagement side friction engaging element, the oil pressure of the engagement side friction engaging element, and the rotational speed of the engine during the power-on down-shift operation in the above prior automatic transmission control device. According to the prior automatic transmission control device, when the automatic transmission is shifted to a certain gear stage under a fixed vehicle speed, the time or timing when the oil pressure of the engagement side friction engaging element begins to be increased at the power-on down-shift is generally always constant. In the power-on down-shift of the automatic transmission, however, there are various shift modes, for example, 3→2 shift in which the automatic transmission is shifted from the 3rd gear to the 2nd gear, 4 (O/D)→2 shift in which the automatic transmission is shifted from the 4th gear to the 2nd gear, and so on. Accordingly, in the prior control device, since the time when the oil pressure of the engagement side friction engaging element begins to be increased at the power-on down-shift is generally constant if the above various down-shift operations are performed under the same fixed vehicle speed, the rotational speed of the engine is temporally increased (3→2 shift) or shift-shock occurs (4 (O/D)→2 shift) as shown in FIG. 8. These phenomena are, of course, undesirable because they make the driver and the passengers uncomfortable.

A need exists for an improved automatic transmission control device that is able to overcome the above drawbacks.

SUMMARY OF INVENTION

In accordance with one aspect of the present invention, an automatic transmission includes a rotatable engine shaft, a rotatable output shaft, a plurality of friction engaging devices disposed between the engine shaft and the output shaft to control gear ratios, and a control device for controlling engagement and disengagement of each of the friction engaging devices so that during a first power-on down shift operation an engagement side friction engaging device is caused to engage while a disengagement side friction engaging device is caused to disengage and so that during a second power-on down shift operation different from the first power-on down shift operation an engagement side friction engaging device is caused to engage while a disengagement side friction engaging device is caused to disengage. The control device is designed to change the time when the engagement side friction engaging device begins to engage based upon whether the first power-on down shift operation is being performed or the second power-on down shift operation is being performed.

According to another aspect of the present invention, an automatic transmission for use in an automobile having a throttle valve includes a rotatable engine shaft, a rotatable output shaft, a plurality of friction engaging devices disposed between the engine shaft and the output shaft to control gear ratios, and a control device for controlling engagement and disengagement of each of the friction engaging devices. the control device is designed to effect power-on down shift operations during which an engagement side friction engaging device is caused to engage while a disengagement side friction engaging device is caused to disengage. The control device also changes the time when the engagement side friction engaging device begins to engage based upon the opening speed of the throttle valve.

In accordance with a still further aspect of the present invention, an automatic transmission includes a rotatable engine shaft, a rotatable output shaft, a plurality of friction engaging devices disposed between the engine shaft and the output shaft to control gear ratios, and a control device which is adapted to control engagement and disengagement of each of the friction engaging devices so that during a power-on down shift operation an engagement side friction engaging device is caused to engage while a disengagement side friction engaging device is caused to disengage. The control device is provided with an arrangement for synchronizing the rotational speed of the engine shaft with the rotational speed of the engagement side friction engaging device during a power-on down shift operation by selecting the time when the engagement side friction engaging device begins to engage after the disengagement side friction engaging device has become disengaged.

BRIEF DESCRIPTION OF THE DRAWING FIGURES

Additional features and aspects of the present invention will become more apparent from the following detailed

3 description of a preferred embodiment considered with reference to the attached drawing figures in which like elements are designated by like reference numerals and wherein:

DETAILED DESCRIPTION OF THE PREFERRED EMBODIMENTS

An automatic transmission control device in accordance with a preferred embodiment of the present invention will be described with reference to the drawing figures.

Figure 1:
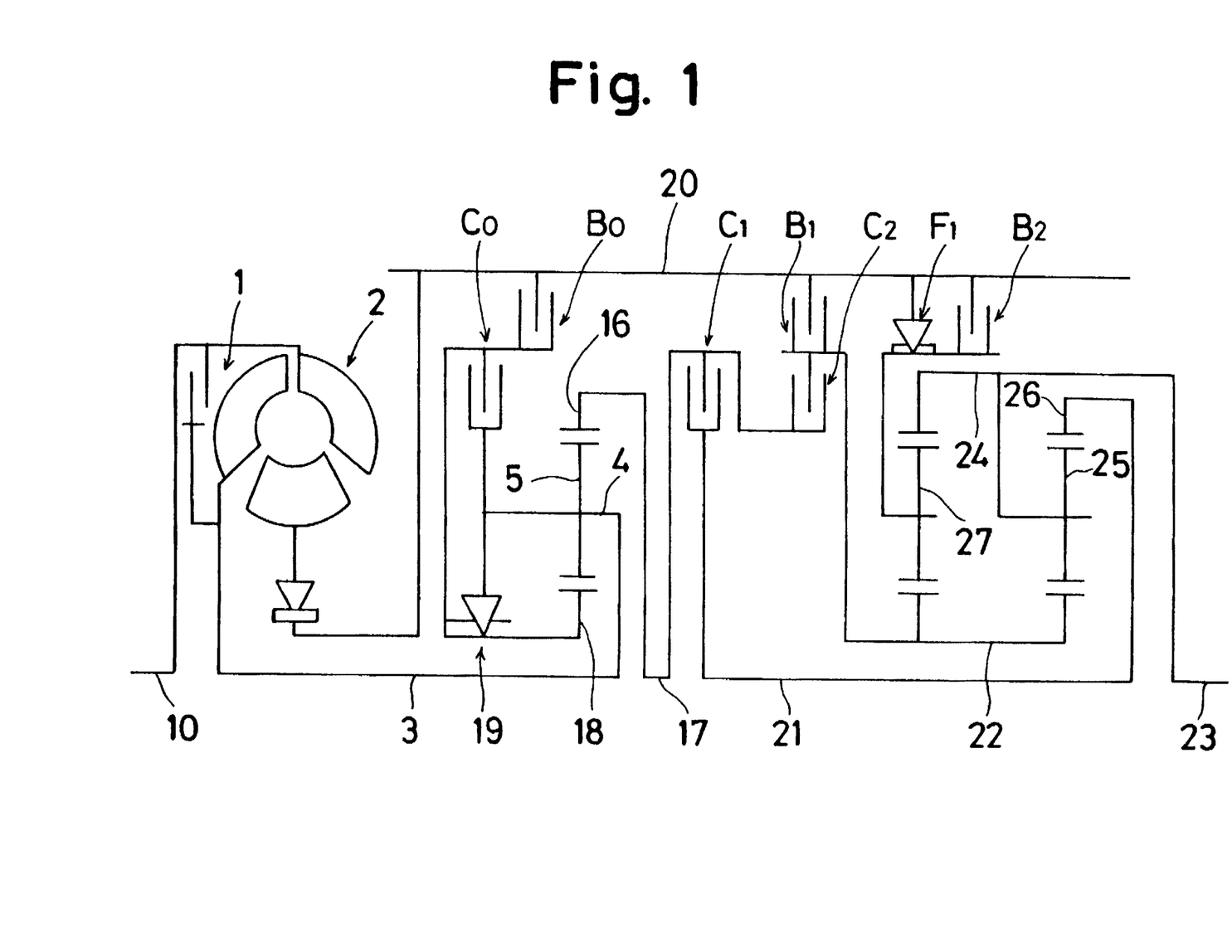
FIG. 1 is a schematic representation of a gear train of an embodiment of an automatic transmission control device in accordance with the present invention.

Referring to FIG. 1 which shows a gear train of an automatic transmission according to the present invention, one end of a turbine shaft 3 is connected to the engine output shaft 10 of the engine via a torque converter 2. The torque converter 2 is provided with a lock-up clutch 1 which prevents the torque converter 2 from functioning and directly connects the turbine shaft 3 to the engine output shaft 10. The other end of the turbine shaft 3 is connected to a carrier 4 of a planetary gear device. A planetary pinion 5 which is rotatably supported on the carrier 4 is engaged with a ring gear 16 connected to a first intermediate shaft 17. Simultaneously, the planetary pinion 5 is engaged with a sun gear 18. A one-way clutch device 19 and an OD clutch device C0 are disposed between the sun gear 18 and the carrier 4, and an OD brake device B0 is disposed between the sun gear 18 and a housing 20.

A C1 clutch device is disposed between the first intermediate shaft 17 and a second intermediate shaft 21, and a C2 clutch device is disposed between the first intermediate shaft 17 and a sun gear 22. A B1 brake device is disposed between the housing 20 and the sun gear 22. The second intermediate shaft 21 is connected to a ring gear 26, and the ring gear 26 is engaged with a planetary pinion 25 which is rotatably supported on a carrier 24 connected to an output shaft 23. The planetary pinion 25 is engaged with the sun gear 22, and the sun gear 22 is further engaged with a planetary pinion 27 which engages a ring gear connected to the carrier 24. A B2 brake device and one way clutch device F1 are disposed in parallel between the housing 20 and a supporting member on which the planetary pinion 27 is rotatably supported. The OD clutch device C0, the C1 clutch device, the C2 clutch device, the OD brake device B0, the B1 brake device and the B2 brake device constitute the multiple element friction engaging devices of the present invention.

In this gear train, the shifting of the transmission is effected by the shift control of a solenoid valve, and the operation of the multiple element friction engaging devices (C0, C1, C2, B0, B1, B2) in each gear ratio is shown in the following Table 1.

TABLE 1

|       | C0 | C1 | C2 | B0 | B1 | B2 |
|-------|----|----|----|----|----|----|
| R     | O  | X  | O  | X  | X  | O  |
| P, N  | O  | X  | X  | X  | X  | X  |
| O/D   | X  | O  | O  | O  | X  | X  |
| D 3rd | O  | O  | O  | X  | X  | X  |
| 2nd   | X  | O  | X  | X  | O  | X  |
| 1st   | O  | O  | X  | X  | X  | X  |
| 2 2nd | O  | O  | X  | X  | O  | X  |
| 1st   | O  | O  | X  | X  | X  | X  |
| L     | O  | O  | X  | X  | X  | O  | where
O: frictionally engaged condition
X: disengaged condition

Figure 3:
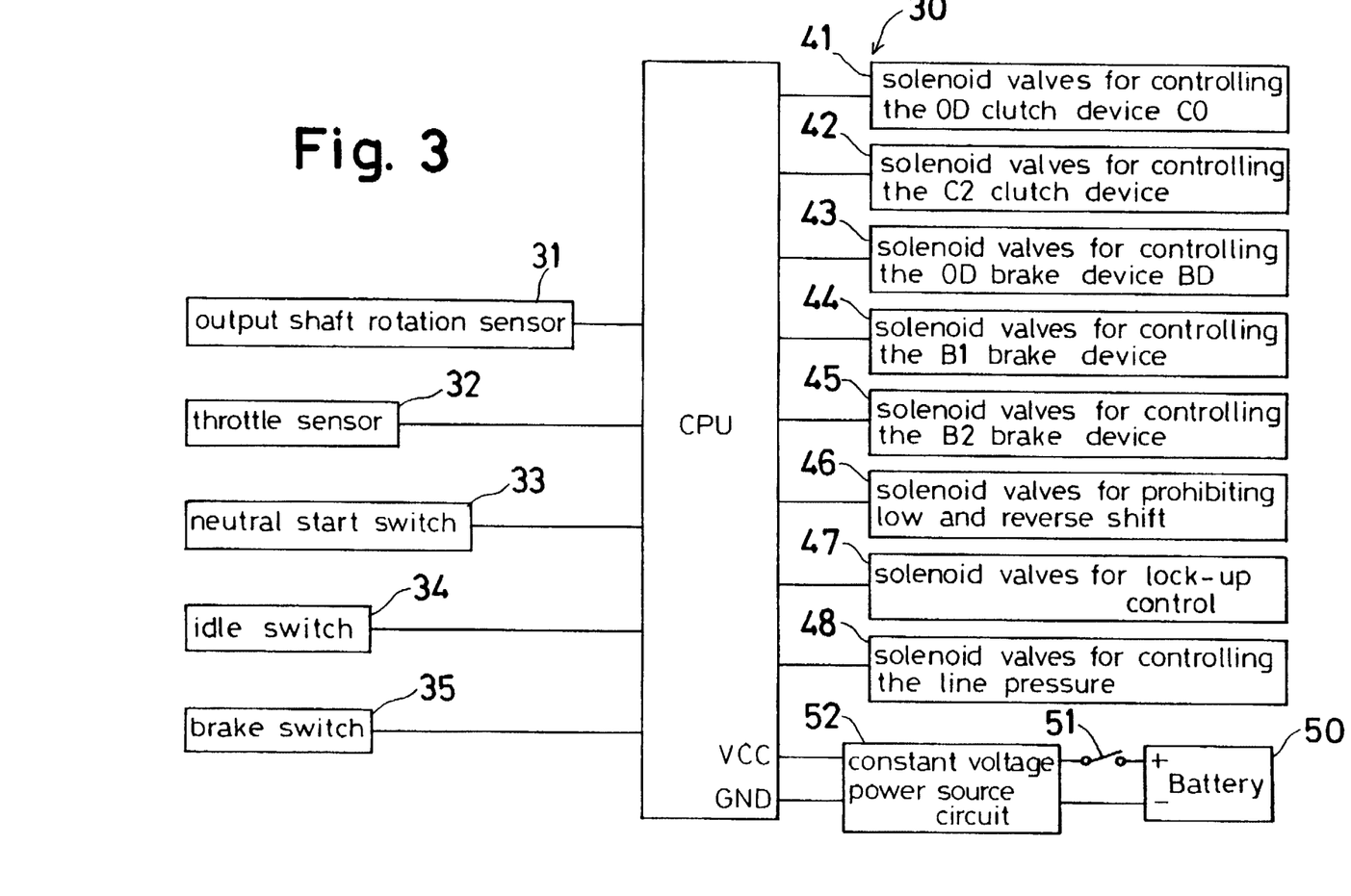
FIG. 3 is a block diagram of an electric control device of the automatic transmission control device in accordance with the present invention.

The operations of the multiple element friction engaging devices (C0, C1, C2, B0, B1, B2) are controlled by oil pressure controlled by an electric control device 30 shown in FIG. 3. The electric control device 30 determines whether or not the shift is possible according to the position of a shift lever (not shown) and the stage of the shift, and controls the operation of the multiple element friction engaging devices (C0, C1, C2, B0, B1, B2) according to the shifting condition shown in the following Table 2.

TABLE 2

| Shift | Disengagement side | Engagement side |
|-------|--------------------|-----------------|
| 2nd→1st | B1 | C0 |
| 3rd→1st | C2 | — |
| O/D→1st | B0, C2 | C0 |
| N→1st | — | C1 |
| R→1st | C2, B2 | C1 |
| 3rd→2nd | C2 | B1 |
| O/D→2nd | B0, C2 | B1 |
| N→2nd | C0 | B1, C1 |
| R→2nd | B2, C0, C2 | B1, C1 |
| O/D→3rd | B0 | C0 |
| N→3rd | — | C1, C2 |
| R→3rd | B2 | C1 |
| N→O/D | C0 | B0, C1, C2 |
| R→O/D | B2, C0 | C2, B1 |
| N→R | B2, C2 | — |

In the Table 2, during the 3→2 power-on down-shift, the C2 clutch device is changed to the disengaged condition and the B1 brake device is changed to the engaged condition. Further, during the 4 (O/D)→2 power-on down-shift, the C2 clutch device and the OD brake device B0 are changed to the disengaged condition and the B1 brake device is changed to the engaged condition.

Figure 2:
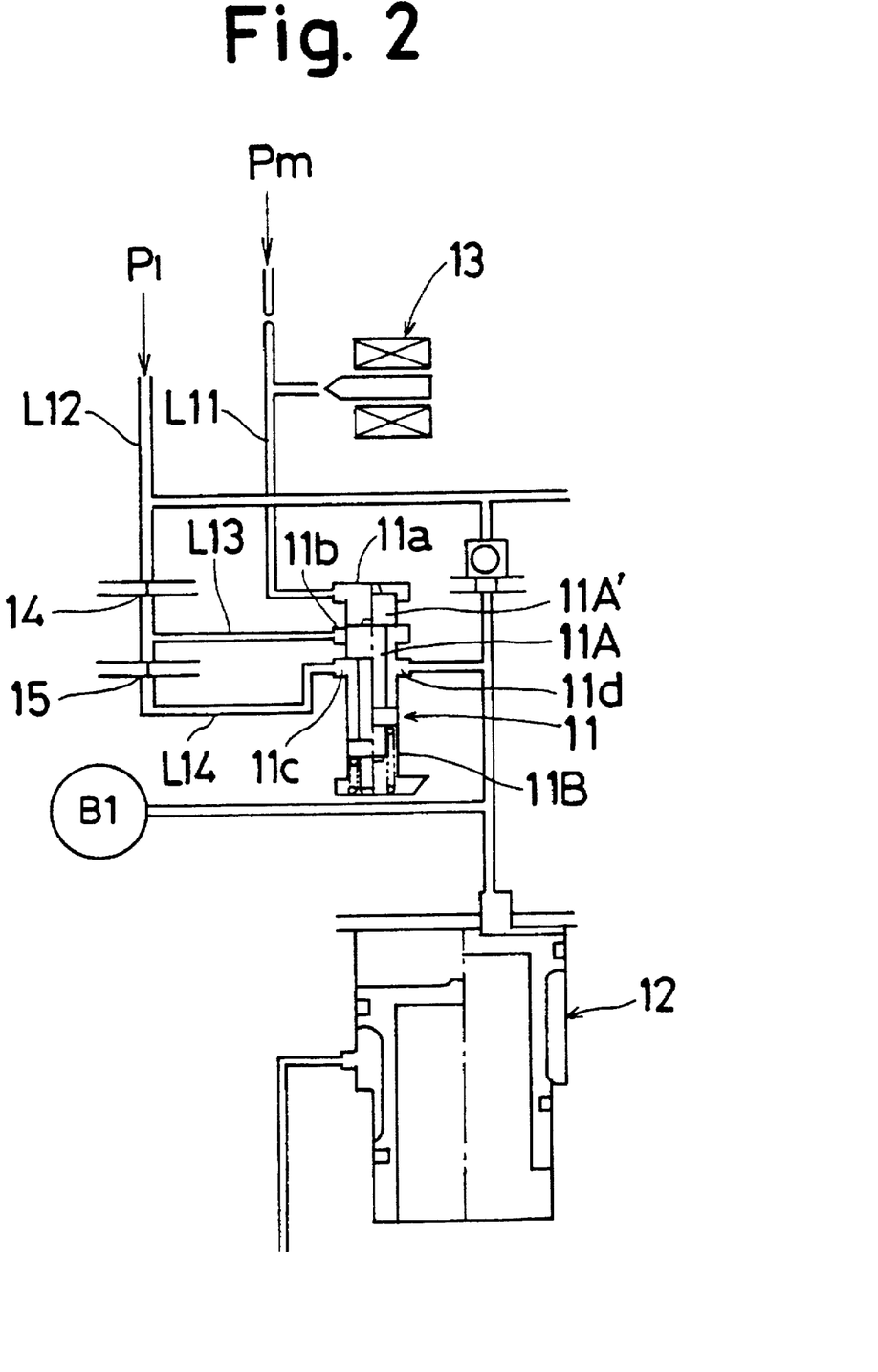
FIG. 2 is a schematic illustration of an oil pressure control circuit of the automatic transmission control device in accordance with the present invention.

FIG. 2 shows a part of the oil pressure circuit communicating with the gear train in FIG. 1. Reference number 11 identifies a 3→2 power-on down-shift orifice control valve and reference numeral 12 indicates a B1 brake accumulator. Modulated pressure Pm which is modulated to a predetermined constant pressure is supplied to a chamber formed at one end of the 3→2 power-on down-shift orifice control valve 11 through a passage L11 and a first port 11a. The modulated pressure Pm acts on a land 11A' of a spool 11A of the 3→2 power-on down-shift orifice control valve 11 and so the spool 11A is urged downwardly against the urging force of a spring 11B which urges the spool 11A upwardly in FIG. 2. A solenoid valve 13 is connected to the passage L11 and controls the oil pressure in the chamber. In this embodiment, the solenoid valve 13 is a normally open type solenoid valve, but it is possible to use a normally closed type solenoid valve.

A passage L12 to which the line pressure PL (i.e., the applying pressure to the B1 brake device) from a 2→3 shift valve (not shown) is supplied is connected to a second port 11b of the 3→2 power-on down-shift orifice control valve 11 through a first orifice 14 and a passage L13, and is simultaneously connected to a third port 11c of the 3→2 power-on down-shift orifice control valve 11 through the first orifice 14, a second orifice 15 and a passage L14. When the oil pressure in the chamber is less than a predetermined value and the spool 11A of the 3→2 power-on down-shift orifice control valve 11 is located in the upper position (i.e., the right half valve condition shown in FIG. 2), the second port 11b and the third port 11c are connected to an outlet port 11d which is connected to the B1 brake device and the B1 brake accumulator 12. Thus, the line pressure PL is (quickly) supplied to the B1 brake device through the first orifice 14. When the oil pressure in the chamber is greater than the predetermined value and the spool 11A of the 3→2 power-on down-shift orifice control valve 11 is located in the lower position (i.e., the left half valve condition shown in FIG. 2), the second port 11b is closed and the third port 11c is connected to the outlet port 11d. Thus, the line pressure P1 is slowly supplied to the B1 brake device. An oil pressure circuit for the 4 (O/D)→2 power-on down-shift further includes control devices for controlling the operation of the brake device and the clutch device in addition to the above oil pressure circuit for the 3→2 power-on down-shift.

Referring to FIG. 3, each of the solenoid valves 41 to 48 is operated by a central control unit CPU. The terminals of a battery 50 are connected to input terminals of a constant voltage power source circuit 52 through an ignition switch 51. The output terminals of the constant voltage power source circuit 52 are connected to a VCC terminal and a GND terminal of the central control unit CPU. The constant voltage power source circuit 52 transforms the output voltage of the battery 50 into the voltage which can operate the central control unit CPU.

An output shaft rotation sensor 31, a throttle sensor 32, a neutral start switch 33, an idle switch 34 and a brake switch 35 are connected to respective input terminals of the central control unit CPU. In FIG. 3, the input interfaces of the sensors and the switches are omitted.

The output shaft rotation sensor 31 is a sensor for detecting the rotational speed of an output shaft of the automatic transmission. The output shaft rotation sensor 31 is disposed in the vicinity of the output shaft of the automatic transmission and generates a pulse signal having a frequency which is changed in response to the rotational speed of the output shaft of the automatic transmission. In this embodiment, the output shaft rotation sensor 31 is an electromagnetic pick-up type rotation sensor which is disposed so as to be opposite to a gear fixed to the output shaft 23 and generates 18 pulses during rotation of the gear. This output signal is sent to the central control unit. If the gear ratio of the differential gear (not shown) disposed between the output shaft and the axis of the driving wheels is clearly known, it is possible to replace the output shaft rotational sensor with another speed sensor which detects the rotational speed of the axis of the driving wheel or the driven wheel.

The throttle sensor 32 is a sensor for detecting the opening degree of a throttle valve (not shown). A digital sensor which detects the rotational angle of the throttle valve by a switch and divides-up the opening degree of the throttle valve, a mechanical sensor, an analog sensor which transforms the rotational angle of the throttle valve into a voltage value and divides the opening degree of the throttle valve by means of an A/D converter, and an electrical sensor are well known forms of throttle sensors. In this embodiment, one of these various types of throttle sensors can be used. The throttle sensor generates a signal dividing the opening degree of the throttle valve into 16 divisions from four signal lines. When the throttle valve is fully closed, the throttle sensor 32 generates a signal θ0. When the throttle valve is fully opened, the throttle sensor 32 generates a signal 15. When the throttle valve is in the condition between the fully closed condition and the fully opened condition, the throttle sensor 32 generates a signal θ1~θ14.

The neutral start switch 34 is a sensor for detecting the position of the shift lever (not shown). The neutral start sensor 34 is provided with a D (drive) range switch, an L (low) range switch, a 2 (second) range switch, an N (neutral) range switch, an R (reverse) range switch and a P (parking) range switch (not shown), and detects the range position.

The idle switch 34 is a sensor for detecting the idling condition of the engine (not shown) and is "ON" when the engine is in the idling condition (in this embodiment, the opening degree of the throttle valve in less than 1.5%). The brake switch 35 is a sensor for detecting the operating condition of a brake apparatus of the vehicle (not shown).

Figure 4:
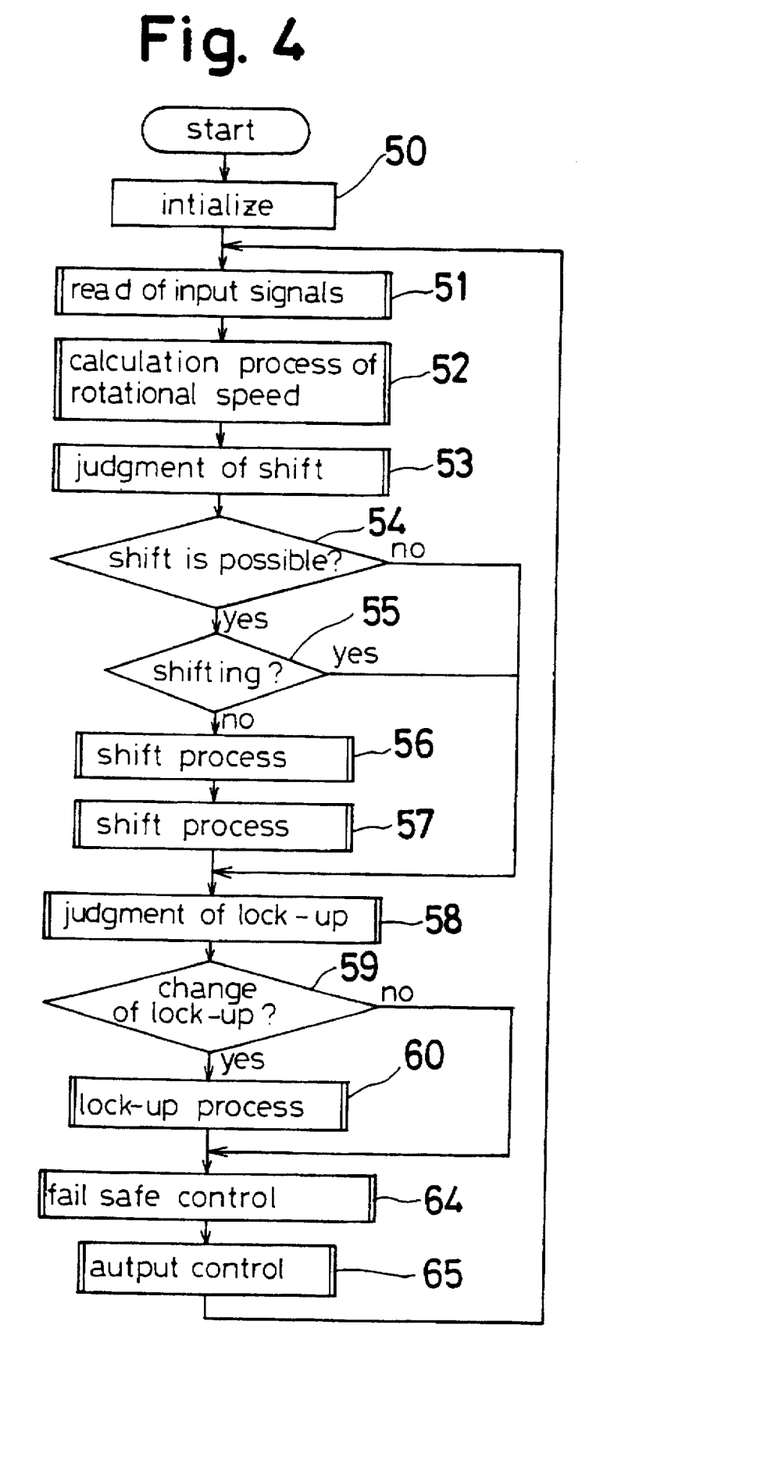
FIG. 4 is a flow chart of a main routine of the electric control device of FIG. 3.

The solenoid valves 41 for controlling the OD clutch device C0, the solenoid valves 42 for controlling the C2 clutch device, the solenoid valves 43 for controlling the OD brake device B0, the solenoid valves 44 for controlling the B1 brake device, the solenoid valves 45 for controlling the B2 brake device, the solenoid valves 46 for prohibiting low and reverse shift, the solenoid valves 47 for lock-up control and the solenoid valves 48 for controlling the line pressure are connected to respective output terminals of the central control unit CPU. The solenoid valve 13 is included in the solenoid valves 48 for controlling the B1 brake device. In FIG. 4, output interfaces and drive circuits of the solenoid valves 41 to 48 are omitted.

The operation of the solenoid valves 41 to 48 is controlled by the central control unit CPU. The central control unit CPU includes memories, timers including a control timer and registers such as RAM, ROM and so on. The central control unit CPU starts to carry out a main routine shown in FIG. 5, when the ignition switch 37 is changed ("ON") and voltage is applied.

Referring to FIG. 4, when the central control unit CPU starts to carry out the main routine, each of the memories is initialized at step 50. Then, the signals of each of the sensors and switches which are connected to the input terminals of the central control unit CPU are read at step 51. Next, a rotational speed calculation process is carried out at step 52. At step 52, the output shaft rotational speed N0 is calculated in accordance with the output signal of the output shaft rotation sensor 31 and the vehicle speed is calculated by the output shaft rotational speed N0, the gear ratio between the output shaft and the wheel axis, and the diameter of the wheel.

Then, a shift judgment is carried out at steps 53, 54. At the steps 53, 54, it is judged whether the automatic transmission should be shifted (or can be shifted) from the present gear condition to another gear condition in accordance with the position of the shift lever, the vehicle speed and the throttle opening degree. Next, if it is determined at step 54 that the shift is possible (a shift permission flag is "ON"), the program proceeds to step 55 where it is determined whether the automatic trammission is now shifting. If the automatic trammission is not now shifting, a shift process is carried out at step 56 and then a shift process is carried out at step 57. A control time of the control timer which is used in the shift control is determined at step 56.

Next, a lock-up determination is carried out at steps 58, 59. If there is a change of lock-up, a lock-up process is carried out at a step 60.

If it is determined at step 54 that the shift is impossible or if it is determined at step 55 that the automatic trammission is now shifting, steps 56, 57 are bypassed and step 58 is carried out.

When the lock-up process is carried out at the step 60, a fail safe control is carried out at a stop 64 and then an output control is carried out at step 65.

In the output control, when the position of the shift lever is in the R range position under the condition in which the shift permission flag is "ON", or when the shift-up is performed and the engine is in the power-off condition (the throttle opening degree θ is smaller than θ2 (θ<θ2), or the idle switch is "ON") under the condition in which the shift permission flag is "ON", a power-off up-shift flag is "ON" and the shift permission flag is "'OFF", and then a shifting flag is "ON". When the shift-up is performed and the engine is in the power-on condition (the throttle opening degree θ is larger than θ2 (θ≧2) with the shift lever in a position other than the R range position, a power-on up-shift flag is "ON" and the shift permission flag is "OFF ", and then the shifting flag is "ON". When the shift-down is performed with the shift lever in a position other than the R range position, a down-shift flag is "ON" and the shift permission flag is "OFF", and then the shifting flag is "ON".

Figure 7:
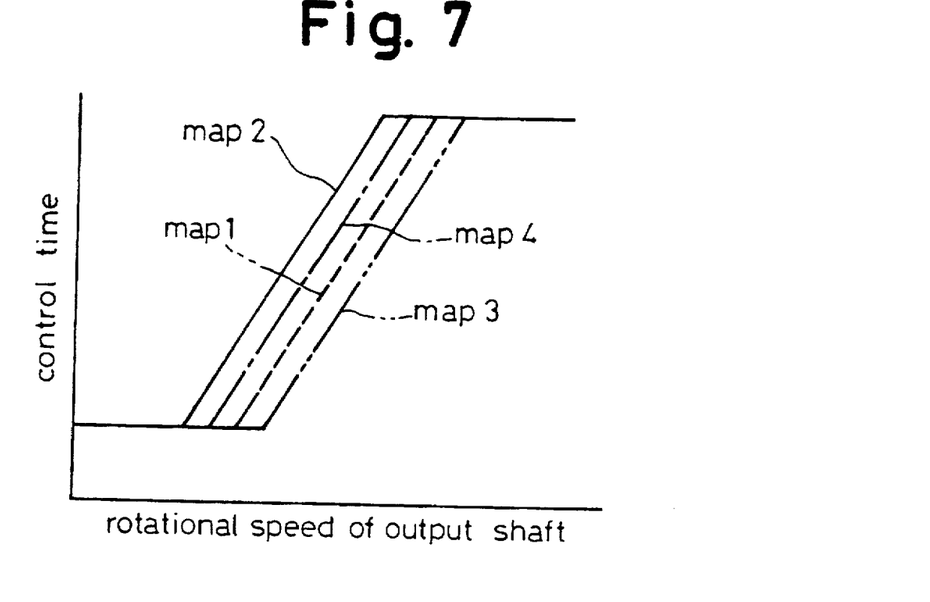
FIG. 7 shows a control map used in the automatic transmission control device in accordance with the present invention.

When the down-shift flag is "ON" under the condition in which the shift permission flag is "ON" or the shifting flag is "ON", a down-shift routine is carried out. When the power-off up-shift flag is "ON", a power-off up-shift routine is carried out. When the power-on up-shift flag is "ON", a power-on up-shift routine in carried out. In each of these shift routines, "ON" and "OFF" of the shift solenoid valves and the timing solenoid valves are controlled in accordance with the control time of the control timer. For example, when the automatic transmission is shifted from the 3rd gear condition to the 2nd gear condition at the power-on condition, the 3-2 shift solenoid valve is changed ("ON") and then the solenoid valve 13 is changed after the control timer is ended. The control time of the control timer is determined by a control map stored in the central control unit CPU and shown in FIG. 7 and the control timer is started when the 3→2 power-on down-shift is started (i.e., when the 3→2 shift solenoid valve is changed "ON"). Then, if the other solenoid valves, for example, a lock-up control solenoid valve has to change, the central control unit CPU generates an output signal so as to change the lockrap control valve and then the main routine is repeated.

Figure 6:
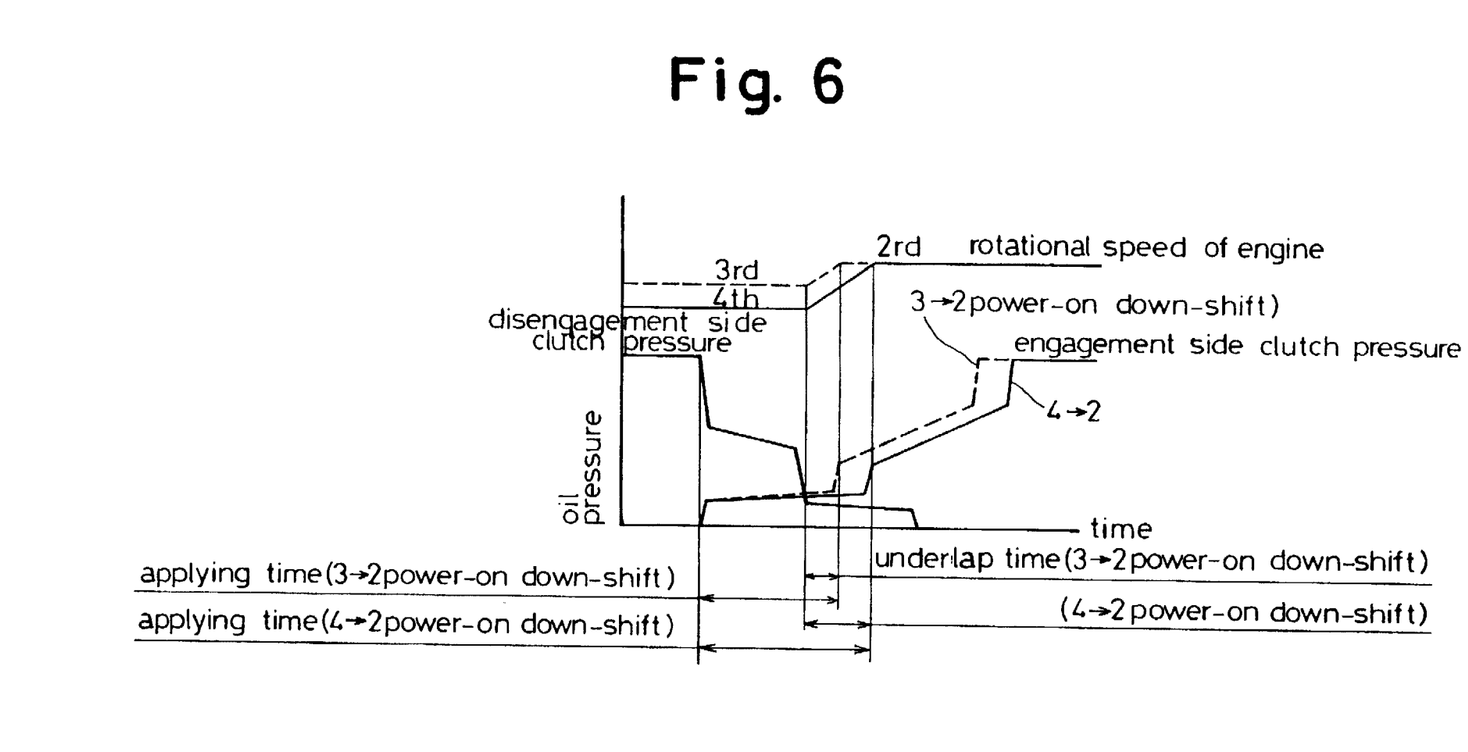
FIG. 6 is a graph illustrating the oil pressure of the disengagement side clutch device, the oil pressure of the engagement side clutch device, and the rotational speed of the engine at the power-on down-shift of the automatic transmission control device in accordance with the present invention.

In this output control operation, the clutch devices and the brake devices are changed over. FIG. 6 is a graph showing characteristics of the oil pressure of the disengagement side clutch device (C2 clutch device), the oil pressure of the engagement side clutch device (B1 brake device), and the rotational speed of an engine at the 3→2 power-on down-shift of this embodiment. As shown in FIG. 6, in the situation where the vehicle drives with a certain generally consistent vehicle speed, the rotational speed under the 3rd gear stage is larger than that under the 4th gear stage (for example, 3rd gear stage: 3000 rpm, 4th gear stage: 2000 rpm). Therefore, it takes a long time until the automatic transmission is shifted from the 4th gear stage to the 2nd gear stage (4000 rpm) as compared with the 3→2 down shift.

In this embodiment, the time it takes until the engagement side clutch device (B1 brake device) begins to engage at the 4→2 down shift (an applying time) is lengthened as compared with applying time associated with the 3→2 down shift. In this way, the rotational speed of the engine at the end of the 4→2 down shift is equalized with that at the end of the 3→2 down shift.

The underlap time represents the interval until the engagement side clutch device is really in the engaged condition after the disengagement side clutch device is really made to be in the disengaged condition. The rotational speed of the engine is changed during this undefiap time. This power-on down-shift control is performed as shown in the flow-chart of FIG. 5. In the 4→2 down shift, in addition to the C2 clutch device being disengaged as in the 3→2 down shift, the OD brake device B0 is also changed to the disengaged condition. However, the decrease of the oil pressure of the OD brake device B0 and the time when the oil pressure of the OD brake device 30 is decreased are almost the same as that of the oil pressure of the C2 clutch device. Therefore, in FIG. 6, the oil pressure characteristics of the OD brake device and the oil pressure of the C2 clutch device are shown by the same general characteristic line.

Figure 5:
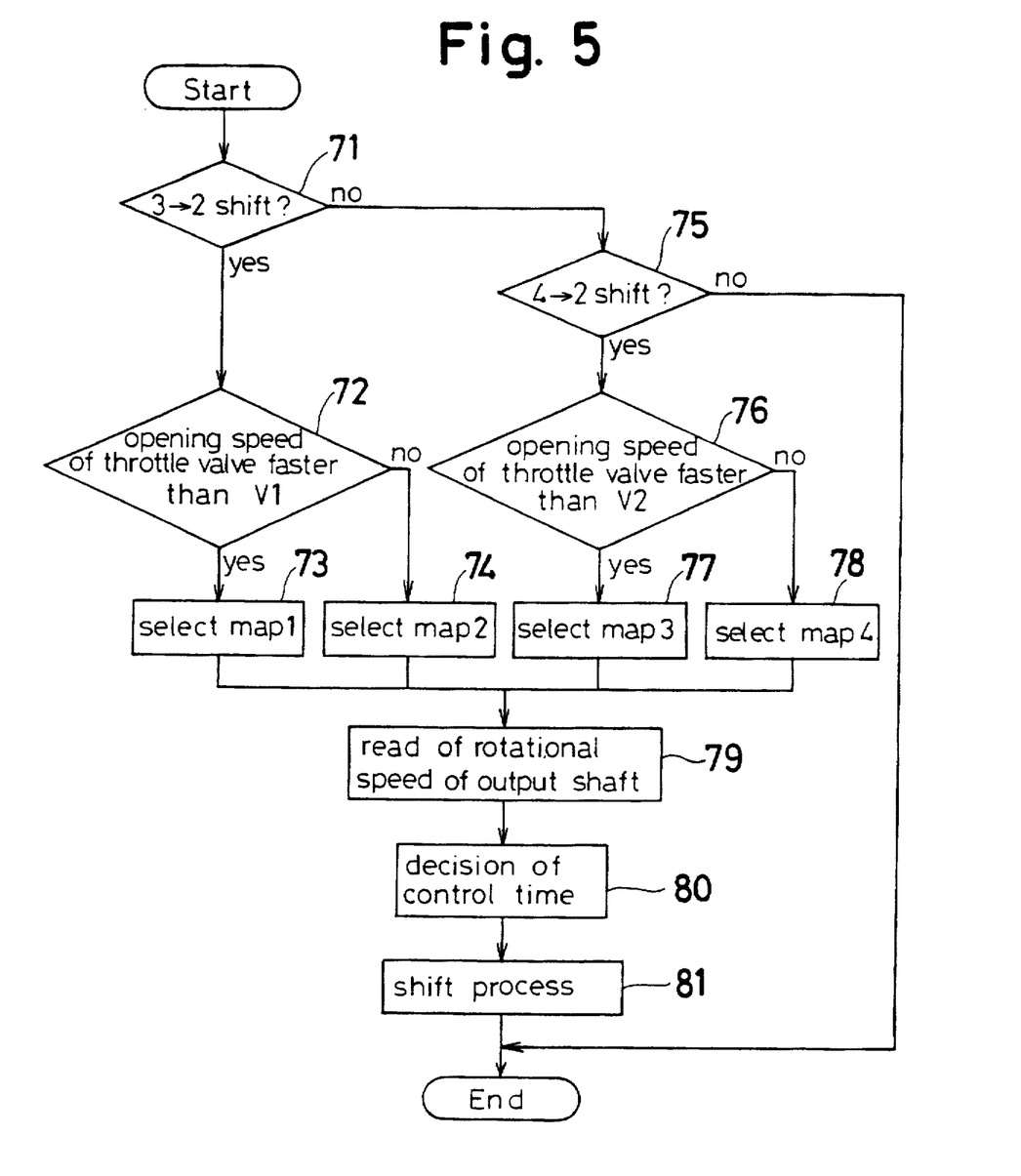
FIG. 5 in a flow chart of sub routine of the electric control device of FIG. 3.

Referring to FIG. 5, FIG. 5 shows a sub routine for step 57 in FIG. 4. At first, it is judged at step 71 whether or not the shift is a 3→2 down shift. If the shift is the 3→2 down shift, it is judged at step 72 whether or not the opening speed of the throttle valve is faster than a predetermined speed V1. If the opening speed of the throttle valve is faster than the predetermined speed V1, a map 1 is chosen at step 73. If the opening speed is slower than the predetermined speed V1, a map 2 is chosen at step 74.

If it is determined at step 71 that the shift is not the 3→2 down shift, the subroutine proceeds to step 75 where it is determined whether or not the shift is a 4→2 down shift. If the shift is the 4→2 down shift, it is judged at step 76 whether the opening speed of the throttle valve is faster than a predetermined speed V2. If the opening speed of the throttle valve is faster than the predetermined speed V2, a map 3 is chosen at step 77. If the opening speed of the throttle valve is slower than the predetermined speed V2, a map 4 is chosen at step 78.

When one of the maps 1–4 is chosen, the rotational speed of the output shaft of the automatic transmission is read at step 79, and then a control time is decided based on the appropriate map and the rotational speed of the output shaft at step 80. Then, at step 81, the shift is performed in accordance with the control time decided at the step 80. Thus, the time when the engagement side clutch device (B1 brake device) begins to engage (the applying time) is changed in accordance with the map. Namely, the time when the oil pressure in the chamber of the 3→2 power-on down-shift orifice control valve 11 in FIG. 2 is decreased lower than the predetermined value by the solenoid valve 13 and when the line pressure P1 begins to be rapidly supplied to the B1 brake device is changed. Consequently, the time which is required until the rotational speed of the engine is synchronized with the rotational speed of the engagement side clutch device after the disengagement side clutch device is disengaged is properly decided by the map and so the temporary increase of the rotational speed of the engine is prevented. Furthermore, the shift-shock which might otherwise occur during the shift is reduced.

Furthermore, in this embodiment, since the increase of the rotational speed of the engine during the shift is presumed based on the opening speed of the throttle valve and the applying time is decided by the result of the presumption, it is possible to more properly determine the time which is required until the rotational speed of the engine is synchronized with the rotational speed of the engagement side clutch device after the disengagement side clutch device is disengaged. Therefore, even if the power-on down-shift stage is the same under the same vehicle speed and the opening speed of the throttle valve is not the same, it is possible to achieve a constant rotational speed of the engine at the end of the shift.

Accordingly, in this embodiment, since the applying time is properly controlled or adjusted in accordance with the power-on down-shift condition (4→2 shift down, 3→2 shift down) and the opening speed of the throttle valve, it is possible to prevent generation of a temporary increase of the rotational speed and it is possible to reduce the shift-shock which otherwise occurs during the shift between gear ratios.

In the above mentioned embodiment, the present invention is applied to the 3→2 down shift control and the 4→2 down shift control. However, the present invention can be applied to the 5→2 down shift control (in case of the 5th stage automatic transmission). Furthermore, it is possible to control the oil pressure of multiple friction engaging elements by a duty-ratio control of the solenoid valves.

As mentioned above, according to the present invention, even though the difference between the rotational speed of the engine before and after the power-on down-shift is different between the down shift from one stage upper gear and the down shift from more than two stage upper gear, the time when the engagement side clutch device begins to engage (the applying time) is changed. As a result, the time which is required until the rotational speed of the engine is synchronized with the rotational speed of the engagement side clutch device after the disengagement side clutch device is disengaged is properly decided by the map and so temporary increase of the rotational speed of the engine is prevented. Furthermore, the shift-shock which otherwise occurs during the shift is reduced.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by others, and equivalents employed, without departing from the spirit of the present invention. Accordingly, all such changes, variations and equivalents which fall within the spirit and scope of the invention as defined in the claims should be embraced thereby.

What is claimed is:

1. An automatic transmission comprising:
   a rotatable engine shaft;
   a rotatable output shaft;
   a plurality of friction engaging devices disposed between the engine shaft and the output shaft to control gear ratios; and
   control means for controlling engagement and disengagement of each of the friction engaging devices so that during a first power-on down shift operation from a one stage upper gear an engagement side friction engaging device is caused to engage while a disengagement side friction engaging device is caused to disengage and so that during a second power-on down shift operation from at least a two stage upper gear an engagement side friction engaging device is caused to engage while a disengagement side friction engaging device is caused to disengage, said control means changing a time when the engagement side friction engaging device begins to engage based upon whether the first power-on down shift operation from the one stage upper gear is being performed or the second power-on down shift operation from at least the two stage upper gear is being performed.

2. The automotive transmission according to claim 1, wherein said control means includes means for determining an opening speed of a throttle and means for determining a rotational speed of the output shaft, the time when the engagement side friction engaging device begins to engage being set by the control means on the basis of the opening speed of the throttle and the rotational speed of the output shaft.

3. The automotive transmission according to claim 1, wherein said control means includes a plurality of maps for determining the time when the engagement side friction engaging device begins to engage.

4. The automotive transmission according to claim 3, wherein said control means includes means for selecting one of said maps depending upon whether the first power-on down shift operation is being performed or whether the second power-on down shift operation is being performed.

5. The automotive transmission according to claim 3, wherein said control means includes means for selecting one of said maps depending upon whether the first power-on down shift operation is being performed or whether the second power-on down shift operation is being performed, and depending upon a throttle opening speed.

6. The automotive transmission according to claim 3, wherein said control means includes means for selecting one of said maps based upon whether the first power-on down shift operation is being performed or whether the second power-on down shift operation is being performed and based upon a throttle opening speed, the time when the engagement side friction engaging device begins to engage being set by the control means on the basis of the selected map and the rotational speed of the output shaft.

7. The automotive transmission according to claim 1, wherein said engagement side friction engaging device that is engaged during the first power-on down shift operation is the same as the engagement side friction engaging device that is engaged during the second power-on down shift operation.

8. An automatic transmission for use in an automobile having a throttle valve, comprising:
   a rotatable engine shaft;
   a rotatable output shaft;
   a plurality of friction engaging devices disposed between the engine shaft and the output shaft to control gear ratios;
   means for determining whether a power-on down shift operation is from a one stage upper gear or whether the power-on down shift operation is from at least a two stage upper gear; and
   control means for controlling engagement and disengagement of each of the friction engaging devices to effect power-on down shift operations during which an engagement side friction engaging device is caused to engage while a disengagement side friction engaging device is caused to disengage, said control means changing a time when the engagement side friction engaging device begins to engage so that when the means for determining determines that the power-on down shift operation is from a one stage upper gear the engagement side friction engaging device begins to engage after a first time and so that when the means for determining determines that the power-on down shift operation is from at least a two stage upper gear the engagement side friction engaging device begins to engage after a second time that is different from said first time.

9. The automotive transmission according to claim 8, wherein said control means includes a plurality of maps for determining the time when the engagement side friction engaging device begins to engage.

10. The automotive transmission according to claim 9, wherein said control means includes means for selecting one of said maps based on the opening speed of the throttle valve and whether a first power-on down shift operation is being performed from one gear ratio to another gear ratio or whether a second power-on down shift operation is being performed from said one gear ratio to a gear ratio different from said another gear ratio.

11. An automatic transmission comprising:
   an engine shaft which is rotatable at a rotational speed;
   an output shaft which is rotatable at a rotational speed;
   a plurality of friction engaging devices disposed between the engine shaft and the output shaft to control gear ratios; and
   control means for controlling engagement and disengagement of each of the friction engaging devices so that during a power-on down shift operation a rotating engagement side friction engaging device is caused to engage while a disengagement side friction engaging device is caused to disengage, said control means including means for synchronizing the rotational speed of the engine shaft with the rotational speed of the engagement side friction engaging device during a power-on down shift operation by selecting a time when the engagement side friction engaging device begins to engage after the disengagement side friction engaging device has become disengaged, said means for synchronizing selecting the time when the engagement side friction engaging device begins to engage on the basis of the gear ratio from which the power-on down shift operation is being made and the gear ratio to which the power-on down shift operation is being made.

12. The automotive transmission according to claim 10, including output shaft rotational speed determining means for determining the rotational speed of the output shaft, and throttle valve opening speed determining means for determining an opening speed of a throttle valve, said means for synchronizing selecting said time based on the rotational speed of the output shaft determined by said output shaft rotational speed determining means and the throttle valve opening speed determined by said throttle valve opening speed determining means.

13. The automotive transmission according to claim 12, wherein said means for synchronizing includes a plurality of maps which each identify different times at which said engagement side friction engaging device is to begin to engage.

14. The automotive transmission according to claim 13, wherein said means for synchronizing selects one of said maps based on the gear ratio from which the power-on down shift operation is being made and the gear ratio to which the power-on down shift operation is being made.

* * * * *

UNITED STATES PATENT AND TRADEMARK OFFICE
CERTIFICATE OF CORRECTION

PATENT NO. : 5,707,318

DATED : January 13, 1998

INVENTOR(S) : Masato SHIMEI, et al.

It is certified that error appears in the above-indentified patent and that said Letters Patent is hereby corrected as shown below:   On the title page,
   [73]   Assignee:   Aisin Seiki Kabushiki Kaisha,      Kariya, Japan Signed and Sealed this Eighth Day of June, 1999

*Attest:*

Q. TODD DICKINSON

*Attesting Officer*     Acting Commissioner of Patents and Trademarks